3,112,275
REGENERATION OF HYDROCARBON SOLUTIONS OF TRIALKYL PHOSPHATE USED IN PROCESSING OF NUCLEAR FUEL
Charles W. Pollock, Richland, and Theodore R. McKenzie, Pasco, Wash., assignors to the United States of America as represented by the United States Atomic Energy Commission
No Drawing. Filed Aug. 17, 1962, Ser. No. 218,236
5 Claims. (Cl. 252—301.1)

This invention deals with the regeneration of organic solvents that have been used for so-called liquid-liquid extraction processes, for instance for the selective extraction of actinides from acid solutions of neutron-irradiated fuel material. The invention is particularly concerned with the regeneration of trialkyl orthophosphate solutions after use, but the process of this invention can also serve to condition these solvents prior to use for extraction.

The extraction of actinides with trialkyl phosphates, and in particular with tri-n-butyl phosphate, is the basis of a great many extraction processes; the most important of these processes is the so-called Purex process. In this Purex process the solvent is a solution of tri-n-butyl phosphate in an organic hydrocarbon diluent, such as kerosene, toluene or commercially available hydrocarbon mixtures. In the extraction processes with which this invention is concerned, the solvent eventually becomes contaminated by fission products to an undesirably high degree and also by decomposition products of the organic solvent caused by chemical (e.g. hydrolysis) or radiation reactions. The contamination by fission products is due to complexing and coextraction of the fission products by the decomposition products of the solvent, which, of course, impairs the separation.

In order to overcome this drawback and to recondition the solvent stripped of the actinide, the solvent has been washed with a solution of a sodium carbonate-potassium permanganate mixture while permanganate was reduced to manganese dioxide in situ; thereafter the solvent was washed consecutively with nitric acid and sodium carbonate. Finally, the solvent was acidified with dilute acid.

The process just described, however, has a number of drawbacks. It requires continuous addition of fresh permanganate, since prolonged storage would convert unstable permanganate to manganese dioxide, while it is imperative that the manganese dioxide be precipitated in situ.

It is an object of this invention to provide a process for the regeneration of used solvents which is very inexpensive.

It is another object of this invention to provide a process for the regeneration of used solvents which can be carried out at elevated temperature.

It is finally also an object of this invention to provide a process for the regeneration of used solvents with a decontaminating medium which can be preformed in large quantities, because it is stable and does not decompose even at elevated temperatures.

It was found quite unexpectedly that an aqueous slurry of magnesium hydroxide does not only remove the coextracted fission products from the solvent but also removes the organic decomposition products, such as monoalkyl phosphate, dialkyl phosphate, and degraded diluent, without removing the tributyl phosphate from the solvent. This selective removal of the organic decomposition products can also be utilized, if desired, for preconditioning unused technical-grade trialkyl phosphate.

The process of this invention thus comprises preparing an aqueous magnesium hydroxide slurry; contacting said slurry with used solvent containing fission products and organic decomposition products, whereby the fission products and decomposition products are removed from the solvent and taken up by the aqueous slurry; and separating the aqueous slurry from the regenerated solvent.

The magnesium hydroxide is preferably suspended or "slurried" in an aqueous sodium hydroxide solution. This slurry is prepared, for instance, by adding magnesium nitrate to a solution of sodium hydroxide. A concentration for the magnesium hydroxide of from 1 to 10% is satisfactory, and the concentration of the sodium hydroxide preferably ranges between about 0.5 and 2 M; however, an about 1 M sodium hydroxide solution containing about 5% by weight of magnesium hydroxide is preferred.

In the following, an example is given to illustrate the superiority of the process of this invention over the methods used heretofore.

*Example*

A solution of 30 volume percent of tributyl phosphate in Shell Spray Base which had been used for the extraction of actinides in the Purex process and had been stripped of the actinides by means of mineral acid was used as stock solution for 11 runs. The diluent was a kerosene having a maximum specific gravity of 0.8 and a maximum viscosity of 2.0 centipoises, both at 25° C., a minimum flash point (closed cup) at 140° F. and a maximum aromatics content of 1% by volume. This stock solution contained zirconium and $Nb^{95}$ in a total concentration of $3.265 \times 10^4$ microcuries per gallon ($\mu c./gal.$) and $5.4 \times 10^3$ microcuries of $Ru^{106+103}$ per gallon. Runs 1–8 were carried out according to conventional regeneration methods, while in runs 9–11 the process of this invention was used.

All hydroxide slurries were prepared as described before by the addition of calcium nitrate or magnesium nitrate, respectively, to a 1 M sodium hydroxide solution; the carbonate slurries were prepared analogously by adding the nitrate to a 3% solution of sodium carbonate.

The same operation was used in all runs. Equal volumes of tributyl phosphate-diluent solution and decontaminating or washing medium were contacted for five minutes at between 50 and 55° C. Four contacts were carried out in each run, a fresh portion of washing medium being employed for each contact. After each contact the zirconium-niobium content was determined by gamma energy analysis with a 256-channel gamma energy analyzer and after the fourth run also that of ruthenium. The results are compiled in the table below as concentrations remaining in the organic solvent and also as decontamination factors (DF), which are the concentrations in the aqueous slurry divided by the concentrations in the tributyl phosphate-diluent solution.

| Run No. | Washing Medium | After first contact | | After second contact | | After third contact | | After fourth contact | | | |
|---|---|---|---|---|---|---|---|---|---|---|---|
| | | Zr, Nb | | Zr, Nb | | Zr, Nb | | Zr, Nb | | Ru | |
| | | µc./gal. ×10⁻³ | DF | µc./gal. ×10⁻³ | DF | µc./gal. ×10⁻³ | DF | µc./gal. ×10⁻³ | DF | µc./gal. ×10⁻³ | DF |
| 1 | 1 M NaOH | 23.7 | 1.4 | 23.7 | 1.4 | 16.0 | 2.0 | 11.5 | 2.8 | 1.7 | 3.2 |
| 2 | 1 M NaOH—.02 N KMnO₄ | 30.0 | 1.1 | 21.3 | 1.5 | 10.0 | 3.3 | 6.6 | 5.0 | 2.05 | 2.6 |
| 3 | 3% Na₂CO₃—.02 N KMnO₄ | 13.0 | 2.5 | 11.0 | 2.9 | 11.0 | 3.1 | 10.0 | 3.1 | 3.5 | 1.6 |
| 4 | 3% Na₂CO₃ | 16.0 | 2 | 11.0 | 2.9 | 8.6 | 3.8 | 8.5 | 3.8 | 3.3 | 1.6 |
| 5 | 3% Na₂CO₃—5% CaCO₃ | 6.6 | 5 | 3.0 | 11 | 1.1 | 30 | 0.28 | 117 | 2.2 | 2.4 |
| 6 | 3% Na₂CO₃—10% MgCO₃ | 1.5 | 21 | 0.48 | 68 | 0.44 | 74 | 0.20 | 166 | 2.3 | 2.4 |
| 7 | 3% Na₂CO₃—5% MgCO₃ | 4.9 | 6.7 | 4.0 | 8 | 2.4 | 14 | 1.2 | 27 | 1.5 | 3.5 |
| 8 | 1 M NaOH—5% Ca(OH)₂ | 12.0 | 2.6 | 4.3 | 7.6 | 1.7 | 19 | 0.89 | 37 | 1.45 | 3.7 |
| 9 | 1 M NaOH—10% Mg(OH)₂ | 2.37 | 12.0 | 0.28 | 117 | *ND | >10³ | *ND | >10³ | 1.27 | 4.3 |
| 10 | 1 M NaOH—5% Mg(OH)₂ | 0.34 | 95 | *ND | >10³ | *ND | >10³ | *ND | >10³ | 1.03 | 5.2 |
| 11 | 1 M NaOH—1% Mg(OH)₂ | 6.2 | 5 | 2.0 | 16 | 0.05 | 740 | *ND | >10³ | 1.1 | 4.8 |

*ND = not detectable on 256-channel gamma energy analyzer.

It is obvious from the above results that the decontamination by the magnesium hydroxide slurry was radically better than with the other washing media. For instance, while the best decontamination factor after the first contact with one of the conventional washing media was 21 (run 6), a decontamination factor of 95 was obtained with a magnesium hydroxide slurry in run 10. This superiority is even more striking after subsequent contacts. It was especially surprising to find that run 8 did not bring about decontamination comparable to that accomplished by run 10, although a slurry was used there that was expected to be an analogous slurry to that of run 10, namely a calcium hydroxide slurry of the same concentration.

It was determined that in the above experiments the magnesium hydroxide slurries removed also the organic decomposition products, while, for instance, the sodium carbonate-permanganate mixture (run 3) did not accomplish this result to an equal extent.

The caustic washing media used for the regeneration of the solvent can be used for the neutralization of acid waste solutions, for instance those that are obtained in the Purex process.

It will be understood that the invention is not to be limited to the details given herein but that it may be modified within the scope of the appended claims.

What is claimed is:

1. A process of treating an organic solution of tri-n-butyl orthophosphate in hydrocarbon that has been used for extracting actinides from neutron-irradiated fuel and contains fission products selected from the group consisting of zirconium, niobium, ruthenium and mixtures thereof and organic decomposition products, comprising adding an aqueous magnesium hydroxide slurry to said solution whereby said fission products and decomposition products are removed from the solvent and taken up by the slurry; and separating the aqueous slurry from the regenerated organic solution.

2. The process of claim 1 wherein the magnesium hydroxide is slurried in an aqueous sodium hydroxide solution.

3. The process of claim 2 wherein the sodium hydroxide solution has a concentration of from 0.5 to 2 M.

4. The process of claim 3 wherein the magnesium hydroxide content of the slurry ranges between 1 and 2% by weight.

5. The process of claim 2 wherein the slurry consists of a 1 M sodium hydroxide solution in which 5% by weight of magnesium hydroxide are suspended.

No references cited.